Oct. 13, 1970     W. J. GRASINGER     3,534,312

ELECTRICAL COIL AND METHOD OF ATTACHING LEADS

Filed May 9, 1969     2 Sheets-Sheet 1

WITNESSES
Theodore F. Knobel
James F. Young

INVENTOR
William J. Grasinger
BY
Donald R. Lackey
ATTORNEY

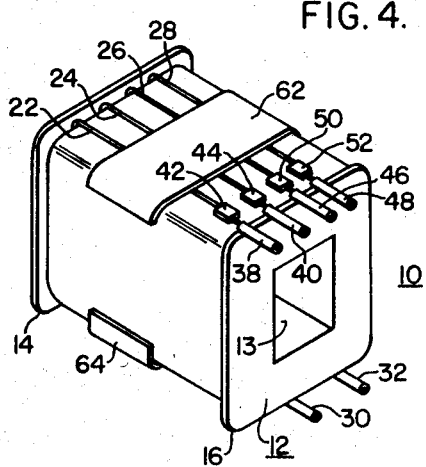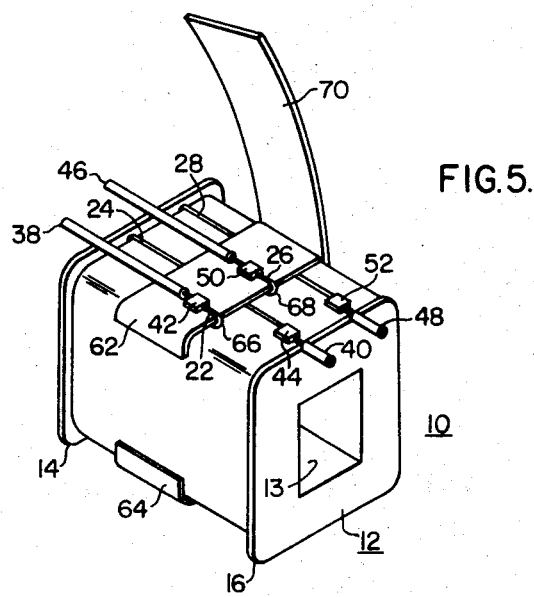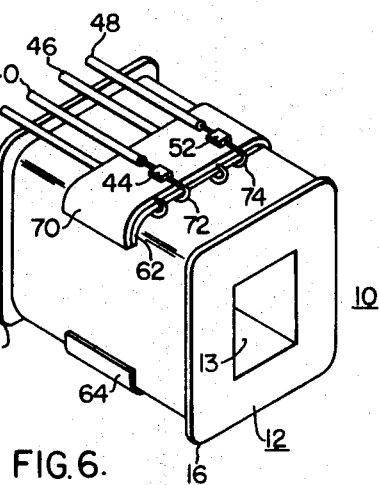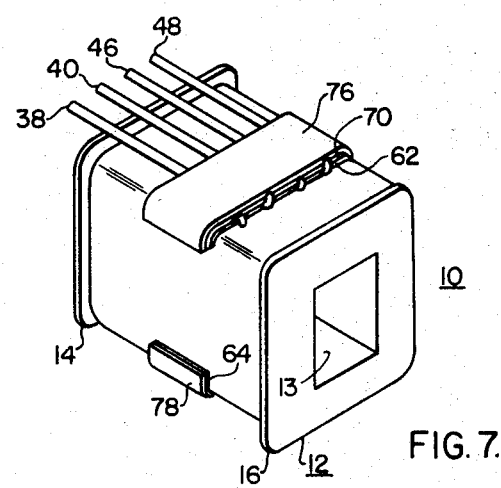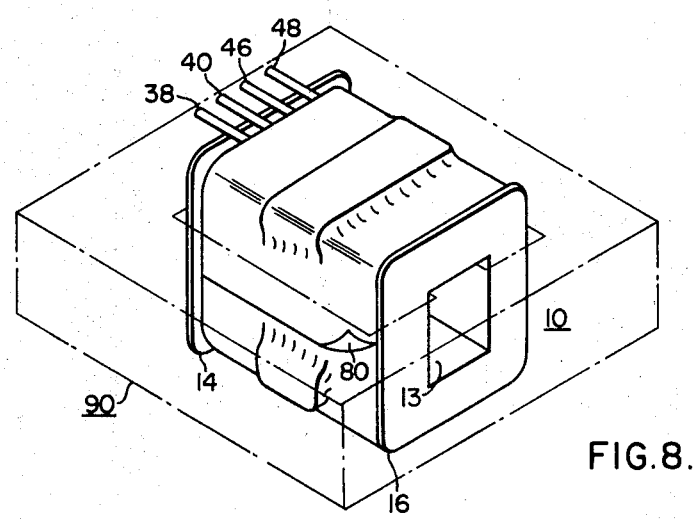

United States Patent Office 3,534,312
Patented Oct. 13, 1970

3,534,312
ELECTRICAL COIL AND METHOD OF ATTACHING LEADS
William J. Grasinger, Stoneboro, Pa., assignor to Westinghouse Electric Corporation, Pittsburgh, Pa., a corporation of Pennsylvania
Filed May 9, 1969, Ser. No. 823,368
Int. Cl. H01f 15/10
U.S. Cl. 336—192
8 Claims

ABSTRACT OF THE DISCLOSURE

An electrical winding structure having a plurality of coils, with the ends of the coils emanating adjacent one end of the winding structure. The ends of the coils are connected to electrical leads, and the coil ends and leads are folded against and secured to the winding structure by a plurality of layers of insulating tape impregnated with a cured thermosetting resin. A method of constructing the winding is disclosed which includes the step of using tape having a pressure sensitive, thermosettable adhesive thereon, which holds the coil ends and leads in the desired location until the resin on the tape is subsequently cured.

BACKGROUND OF THE INVENTION

Field of the invention

The invention relates in general to electrical winding assemblies, and more specifically to new and improved arrangements and methods for electrically connecting and mechanically securing electrical leads to the ends of the coils of electrical winding assemblies.

Description of the prior art

Certain types of electrical winding assemblies, such as winding assemblies for electrical control transformers, require electrical leads to be attached to the ends of the electrical coils of the winding assemblies, the connections insulated, and the coil ends and a portion of the electrical lead firmly secured to the winding assemblies, to prevent mechanical forces from being applied to the coil ends. A common prior art structure has electrical leads attached to the coil ends, the coil ends are stapled to an insulating strip member, such as a strip formed of fiber, and the strip is taped to the winding assembly. While this arrangement is satisfactory from a functional viewpoint, it would be desirable to be able to perform the functions of securing the coil ends and leads to the winding assembly, and insulating the connection between the coil ends and electrical leads, while reducing the manufacturing cost of the apparatus.

SUMMARY OF THE INVENTION

Briefly, the present invention is a new and improved electrical winding assembly in which the coil ends and their associated electrical leads are secured to the winding assembly by a plurality of layers of tape which have a cured thermosetting resin between the layers thereof. The cured resin and tape form a solid insulating structure which firmly holds the coil ends, and provides electrical insulation about the connection between the coil ends and their associated leads. The coil ends and leads are looped back and forth between different layers of the tape, with circumferentially adjacent connections between the coil ends also being disposed between different layers of tape, if desired, to provide additional insulation between closely spaced coil ends and leads.

A new and improved method of constructing the new winding assembly is also disclosed, which facilitates the manufacture of the winding assembly. The insulating tape used in the method has a pressure sensitive thermosettable resin disposed on both major sides thereof, which enables the coil ends and leads to be pressed into the pressure sensitive surface of the tape, to firmly hold the coil ends and leads in the desired position during the subsequent manufacturing steps, which includes the step of curing the thermosettable resin to a permanent solid after the winding assembly has been completed.

BRIEF DESCRIPTION OF THE DRAWINGS

Further advantages and uses of the invention will become more apparent when considered in view of the following detailed description and drawings, in which:

FIG. 4 is a perspective view of the winding assembly of FIG. 3, illustrating the step of applying an insulating tape over the folded coil ends;

FIG. 5 is a perspective view of the winding assembly of FIG. 4, illustrating the steps of folding certain of the coil ends over the tape, and then applying a second layer of tape over the first layer;

FIG. 6 is a perspective view of the winding assembly of FIG. 5, illustrating the step of folding the remaining coil ends and leads over the second layer of tape;

FIG. 7 is a perspective view of the winding assembly of FIG. 6, illustrating the step of applying a third layer of tape over the second layer; and FIG. 8 is a perspective view of the winding assembly of FIG. 7, illustrating the step of applying an outer wrap of insulating tape over the winding assembly, with a magnetic core, shown in phantom, being illustrated in assembled relation with the winding assembly.

DESCRIPTION OF THE PREFERRED EMBODIMENTS

Figure 1:
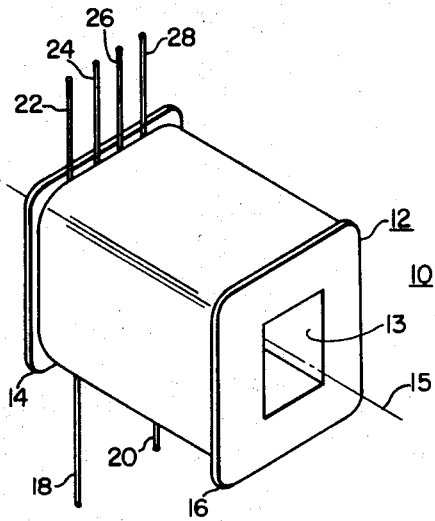
FIG. 1 is a perspective view of a typical winding assembly of the type which may have its leads connected to coil ends and insulated according to the teachings of the invention.

Referring now to the drawings, and FIG. 1 in particular, there is shown a perspective view of an electrical winding assembly 10, of the type which may utilize the teachings of the invention. In this instance, the winding assembly 10 illustrated is for a control transformer, such as those used to step down the voltage to machine tool control components, but any winding assembly of the type which has electrical leads which are attached to the ends of electrical coils, in which the coil ends and leads must be insulatingly secured to the winding assembly, will benefit from the teachings of the invention.

More specifically, winding assembly 10 includes an insulating winding form 12 having an axis 15, about which the coils of the winding are wound, with the form 12 having first and second spaced flange members 14 and 16 at first and second ends thereof respectively, which maintain or support the layers of coil turns and prevent them from moving axially out of their as-wound positions. The coil form 12 has an opening 13 which extends between its ends, for receiving the winding leg portion of a magnetic core, as will be hereinafter explained. For purposes of example, winding assembly 10 has three electrical coils, but the number of coils in any specific winding assembly will depend upon the application. The first coil, which may be the low voltage coil, is wound from an insulated wire conductor, such as enamel coated copper, upon the portion of winding form 12 which interconnects the flange members 14 and 16, with the ends 18 and 20 of the first coil extending outwardly from one side of the winding assembly, adjacent one of the flange members, such as the flange member 14. The second coil, which is also formed of an insulated wire conductor, may be wound concentrically about the first, and it may be a high voltage coil having ends 22 and 24 of the coil wire which extend outwardly from winding assembly 10 adjacent the first flange 14, but as illustrated, the coil ends of the second coil may be circumferentially spaced about 180° from the ends of the first coil, to provide a substantial physical separation of the high and low voltage coil ends. A third high voltage coil, formed of insulated wire conductor, may then be concentrically wound about the second high voltage coil, with the third high voltage coil having ends 26 and 28 of the coil wire extending outwardly from the winding assembly 10, adjacent the first flange 14, circumferentially spaced from the coil ends 22 and 24, but on the same side of the winding assembly as coil ends 22 and 24.

The new and improved structure for securing the coil ends of winding assembly 10, may best be understood by considering the new and improved method of securing and insulating the coil ends and associated leads, as disclosed by the teachings of the invention.

Figure 2:
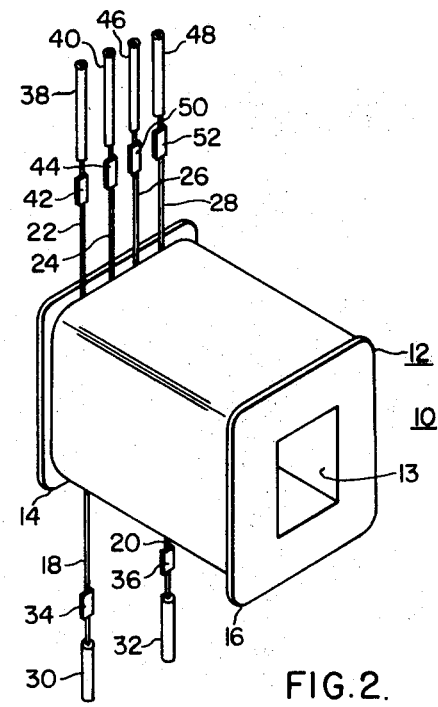
FIG. 2 is a perspective view of the winding assembly of FIG. 1, illustrating the step of connecting electrical leads to the coil ends.

The first step of the method, shown in FIG. 2, is to connect insulated electrical conductors or leads to the wire ends of the coils. This may be accomplished by utilizing connector means, such as crimp type members having an opening into which an end of the coil wire may be inserted, along with the conductor of the insulated electrical lead, with the connector then being crimped to mechanically and electrically connect the coil end to the electrical lead. The crimping of the metallic connector bites through the layer of enamel on the coil wire, making it unnecessary to scrape the coil ends prior to the connecting step. Thus, as shown in FIG. 2, electrical leads 30 and 32 are electrically and mechanically connected to the ends 18 and 20 of the first coil, via crimp type connectors 34 and 36, respectively. In like manner, the ends 22 and 24 of the second coil are electrically and mechanically connected to electrical leads 38 and 40 via connectors 42 and 44, respectively, and the ends 26 and 28 of the third coil are electrically and mechanically connected to electrical leads 46 and 48, via connectors 50 and 52, respectively.

Figure 3:
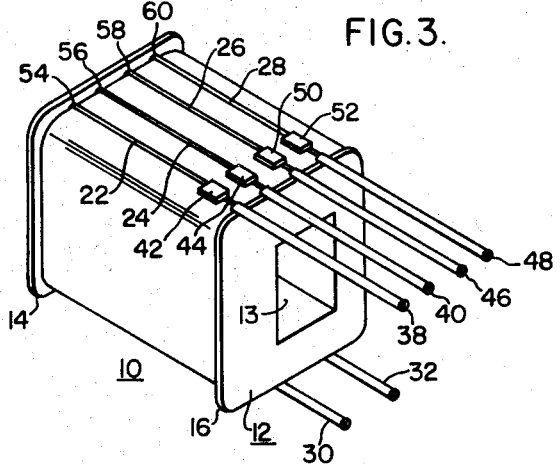
FIG. 3 is a perspective view of the winding assembly of FIG. 2, illustrating the step of folding the coil ends and leads against the outer surface of the winding assembly.

The next step, illustrated in FIG. 3, is to fold or bend the wire of the coil ends at the point where they emanate from the surface of the winding assembly, such that the coil ends and their associated electrical leads extend toward the second flange member 16, parallel with the axis of the winding assembly 10, parallel with one another, and resting against the outer surface of the winding assembly. Thus, as shown in FIG. 3, the wire of coil ends 22, 24 and 26 and 28 are bent at points 54, 56, 58 and 60, respectively, to direct the coil ends and leads along the winding surface toward the second flange member 16. The wire of coil ends 18 and 20 are similarly bent, being directed along the side of winding assembly 10 which is opposite to the side occupied by coil ends 22, 24, 26 and 28.

The next step of the method, illustrated in FIG. 4, is to secure the coil ends against the outer surface of the winding assembly 10. This is accomplished, according to the teachings of the invention, by utilizing an insulating tape, both major outer sides of which contain a pressure sensitive, thermosettable resin. Any suitable tape of this type may be used, such as the double coated polyurethane foam tapes, with the pressure sensitive thermosettable resin system being an epoxy, polyester, or the like.

The high voltage and the low voltage coil ends may both be secured during this step, using separate short lengths of tape 62 and 64, respectively, or by a single piece of tape which is long enough to secure both the high voltage and low voltage leads; or, only the high voltage coil ends may be secured in this step, with the process being repeated to secure the low voltage coil ends, as desired. An advantage of using a short length of tape for the high voltage coil ends and a short length of tape for the low voltage coil ends, besides saving tape, is the fact that the dimension added to the coil build may be minimized on the sides of the winding assembly which will be immediately adjacent the magnetic core structure. Specifically, as shown in FIG. 4, the pressure sensitive, thermosettable tape 62 is applied circumferentially about the winding assembly, axially located approximately midway between the first and second flange members 14 and 16, and circumferentially oriented to cross and secure coil ends 22, 24, 26 and 28 against the outer surface of the winding assembly 10. The next step, shown in FIG. 5, folds or bends certain of the coil ends back toward the first flange member 14, with the bends occurring immediately adjacent the side of the insulating tape 62 which is adjacent the flange member 16. If the coil ends are circumferentially spaced a sufficient distance apart, all of them may be folded in this step. For example, when there are only two coil ends emanating from a side of the winding structure, both may be bent back toward flange 14 in this step. However, when four coil ends emanate from a side, such as the high voltage coil ends 22, 24, 26 and 28, it is preferable to bend alternate coil ends only during this step. Thus, as shown in FIG. 5, coil ends 22 and 26 may be bent or folded at points 66 and 68, respectively, reversing the direction of the coil ends and their associated leads. It is important to note that the length of the coil ends, the width of the tape 62, and the placement of the tape 62, are selected such that connectors 42 and 50 are located approximately midway across the width dimension of the tape 62, after the bends 66 and 68 are made. The coil ends 22 and 26, their associated connectors 42 and 50, and leads 38 and 46, respectively, are firmly pressed against the pressure sensitive, thermosettable adhesive on the upper or exposed surface of tape 62, thus fixing their location. The low voltage coil ends 18 and 20 may be similarly bent, with connectors 34 and 36 being pressed against the pressure sensitive thermosettable adhesive on the outer surface of tape 64.

The next step, shown in FIGS. 5 and 6, is to apply a piece of double-coated, pressure sensitive, thermosettable tape 70 directly over tape 62, with the length and width dimensions of tape 62 being selected such that the two layers of tape enclose or sandwich the connectors 42 and 50, as well as adjacent portions of their associated coil ends and electrical leads. Thus, the bare metallic surfaces of electrical connectors 42 and 50 are completely surrounded by the pressure sensitive, thermosettable adhesive and tape layers, which provides electrical insulation and isolation for these connectors.

The next step, shown in FIG. 6, is to bend the remaining coil ends 24 and 26 at points 72 and 74, respectively, which points are immediately adjacent the flange 16 side of the layers of insulating tape, to reverse the direction of the coil leads 40 and 46 and place connectors 44 and 52 on the exposed surface of insulating tape 70. Connectors 44 and 52, and their immediately adjacent portions of the coil ends and leads, are firmly pressed into the pressure sensitive, thermosettable adhesive on tape 70, to secure their positions.

The next step, shown in FIG. 7, encloses the bare connectors 44 and 52 associated with the high voltage leads 40 and 48, respectively, as well as the bare connectors 34 and 36 associated with the low voltage leads. This is accomplished, as shown in FIG. 7, by applying a length of pressure sensitive, thermosettable tape 76 directly over tape 70, with tape 76 having the pressure sensitive thermosettable adhesive on at least the side which contacts the connectors 44 and 52. It may be double coated, if desired. A similar piece of pressure sensitive, thermosettable tape 78 is applied directly over tape 64, to insulate and protect the connectors 34 and 36.

The next step, shown in FIG. 8, is to wrap the entire circumference of the winding assembly with a wide tape 80, which preferably extends from flange 14 to flange 16, and having a length sufficient to provide about 1½ to 2 turns about the circumference of the winding assembly. Tape 80 should have a pressure sensitive thermosettable adhesive on the side which contacts the winding assembly. A tape having a crepe type insulating backing has been found to be excellent for the outer wrap, because it may be stretched slightly while it is being applied to form a smooth tight outer protective shell on the winding assembly.

The next step, is to cure the thermosettable adhesive on the various layers of tape, by heating the winding assembly to a predetermined temperature for a predetermined time, with the temperature and cycle time utilized depending upon the specific resin system used.

FIG. 8 also illustrates winding assembly 10 in assembled relation with a magnetic core structure 90, with the core structure 90 being shown in phantom in order to more clearly set forth the details of the completed winding assembly.

The completed winding assembly 10, as shown in FIG. 8, features a new and improved structure for securing and insulating the ends of the coils, and their associated coil leads, which includes a plurality of layers of insulating tape. The ends of the coils each have a first portion which extends toward the second flange member 16, and a second portion which extends back toward the first flange member 14, with the first and second portions each being secured by the plurality of layers of tape, and radially separated by at least one layer of tape, with the connector which interconnects an end of a coil to an electrical lead being disposed between two adjacent radial layers of insulating tape. The first portion, for example, of coil end 22, is the portion between bends 54 and 66, and the second portion starts at bend 66 and extends to the connector 42. Cured solid thermosetting resin is disposed between the layers of tape, which may also impregnate the backing of the tape, if desired, with the cured resin and tape mechanically securing the electrical leads and insulating the connectors, preventing mechanical force applied to the leads from being transmitted to the ends of the coils. Circumferentially adjacent connectors may be disposed between different layers of tape, to increase the electrical strength of the insulation between the conductors, and insure that the connectors will not contact one another.

In summary, there has been disclosed a new and improved winding assembly, having a plurality of coils, in which the ends of the coils are mechanically and electrically connected to electrical leads. A plurality of layers of insulating tape are disposed about the winding assembly with the coil ends each looping back and forth between the layers of insulating tape, with the connectors which interconnect the coil ends and electrical leads being sandwiched between two layers of tape. A cured thermosetting resin disposed between the layers of tape, bonds the tape, coil ends, connectors and electrical leads into a solid mass, firmly anchoring the coil ends and leads to the body of the winding assembly, while electrically insulating the connectors.

A new and improved method of manufacturing the winding assembly is also disclosed, which utilizes pressure sensitive, thermosettable tape to hold the coil ends, connectors and electrical leads during the various steps of the manufacturing process. This method, thus facilitates the manufacturing of the winding assembly, as it requires no special equipment in order to secure the coil ends, it eliminates the requirement for preassembling fiber lead strips, it requires less time to manufacture the coils, and the pressure sensitive adhesive performs the dual function of holding the leads in the desired location during manufacturing, and then providing electrical insulation and mechanical support for the leads in the final product.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

I claim as my invention:

1. A method of attaching electrical leads to the wire type coils of an electrical winding assembly, comprising the steps of:

providing an electrical winding assembly having first and second ends, and at least one coil, the ends of which emanate from the winding assembly adjacent the first end thereof, connecting electrical leads to the ends of the wire of which the coil is wound, folding the wire of the coil ends toward the second end of this winding assembly, securing the wire of the coil ends against the outer surface of the winding assembly with a first tape having a pressure sensitive, thermosettable adhesive on both outer sides thereof, folding at least certain of the wires of the coil ends back toward the first end of the winding assembly, with the electrical connection between the coil ends and electrical leads being disposed against and secured by the outer adhesive surface of the first tape, applying a second tape over the first tape, with the second tape having a pressure sensitive, thermosettable adhesive on at least the side which contacts the first tape, to enclose the electrical connections between adhesive surfaces of the first and second tapes, and curing the thermosettable adhesive on the first and second tapes to firmly secure the coil ends and leads to the electrical winding assembly, and insulate the electrical connections between the coil ends and their associated electrical leads.

2. The method of claim 1 wherein the electrical winding assembly has a plurality of coils, the ends of which emanate from the first end of the electrical winding assembly in spaced adjacent relation, wherein the step of folding certain of the wires of the coils back toward the first end of the winding assembly selects alternately disposed wires, and wherein the second tape has a thermosettable adhesive disposed on both sides thereof, and including the steps of folding the remaining wires of the coil ends back toward the first end of the winding assembly, after the step of applying the second tape, with the electrical connection between these coil ends and their associated electrical leads being disposed against and secured by the outer adhesive surface of the second tape, and applying a third tape over the second tape with the third tape having a thermosettable adhesive on at least the side which contacts the second tape, to enclose the electrical connections between the adhesive surfaces of the second and third tapes, and curing the thermosettable adhesive on the first, second and third tapes.

3. The method of claim 1 including the step of wrapping the outside of the winding assembly with at least one turn of a tape having a thermosettable adhesive on at least one side thereof, prior to the curing step.

4. The method of claim 2 including the step of wrapping the outside of the winding assembly with at least one turn of a tape having a thermosettable adhesive on at least one side thereof, prior to the curing step.

5. An electrical winding assembly having first and second ends, comprising:

a plurality of electrical coils formed of wire type conductor, the ends of which emanate from the electrical winding assembly adjacent the first end thereof, a plurality of electrical leads,
means connecting each of the ends of said plurality of coils to one of said electrical leads,
a plurality of layers of insulating tape disposed in contacting, radial relation about at least a portion of the outer circumferential surface of the electrical winding assembly,
the ends of said plurality of coils each having a first portion which extends toward the second end of the winding assembly, and a second portion which extends back toward the first end of the winding assembly, with the first and second portions of each coil end being secured by said layers of insulating tape, and radially separated by at least one layer of insulating tape, and with the means connecting each coil end and its associated electrical lead being disposed between two adjacent radial layers of said insulating tape.

6. The electrical winding assembly of claim 5 wherein certain of the means connecting the coil ends and their associated electrical leads are between the same layers of insulating tape, while the means connecting the remaining coil ends and their associated electrical leads are between different layers of insulating tape.

7. The electrical winding assembly of claim 6 wherein the electrical connectors disposed between the same layers of insulating tape are from alternate circumferentially located coil ends.

8. The electrical winding assembly of claim 5 wherein the layers of insulating tape are impregnated with a cured thermosetting resin.

References Cited

UNITED STATES PATENTS 2,875,420    2/1959    Hofer _____ 336—792

ELLIOT A. GOLDBERG, Primary Examiner

U.S. Cl. X.R.

29—605